Aug. 18, 1959   R. F. GOOD   2,899,933
PNEUMATIC IMPACT TOOL
Filed Dec. 3, 1954   6 Sheets-Sheet 2

INVENTOR.
ROMER F. GOOD
BY
Edward H. Lumpston
HIS ATTORNEY

R. F. GOOD 2,899,933

PNEUMATIC IMPACT TOOL

Filed Dec. 3, 1954

INVENTOR.
ROMER F. GOOD

BY
Edward N. Cumpston
HIS ATTORNEY

United States Patent Office 2,899,933
Patented Aug. 18, 1959

2,899,933

PNEUMATIC IMPACT TOOL

Romer F. Good, Brighton, N.Y., assignor to Morgan Machine Company, Inc., Rochester, N.Y., a corporation of New York Application December 3, 1954, Serial No. 472,887

19 Claims. (Cl. 121—13)

This invention relates to fluid driven impact tools and particularly to pneumatic impact tools adapted to deliver a single blow upon actuation of a release mechanism, one object of the present invention being the provision of a more practical and useful tool of this nature.

Many of the devices heretofore used for this purpose comprise a piston or hammer reciprocating in a cylinder and driven by compressed air or other suitable fluid which is admitted to the cylinder by means of valves actuated by a release mechanism. Devices of this type have the inherent drawback that the compressed air or other driving fluid must pass through a relatively narrow valve opening during the piston stroke, to reach the cylinder and propel the piston forward. This results in considerable loss of pressure and efficiency, and since the driving fluid requires an appreciable amount of time to travel through restricted valve openings, the piston or other moving parts of devices of this type are relatively slow in attaining maximum speed and therefore cannot deliver a blow with maximum possible force. For this reason, another object of this invention is the construction of an impact tool of the above description wherein the compressed driving fluid is admitted to the cylinder behind the piston and attains full pressure therein before the piston is released for its power stroke. This results in the full pressure of the compressed fluid being applied to the piston at the time of release, and therefore maximum speed and impact are obtained.

It has been found that impact tools heretofore in use, which are designed to deal heavy blows have had the disadvantage of having objectionally violent recoil which has rendered them difficult and sometimes dangerous to use. Further, this recoil tends to move the tool rearwardly away from the work being impacted, which often causes the delivery of a light or imperfectly aimed blow. For this reason, other objects of this invention include the provision of a tool having less recoil than those heretofore provided, and the provision of a tool whose working parts are uneffected by a moderate amount of recoil.

Impact tools have heretofore been designed to deliver an uncontrolled impact to the work. However, it often happens that one particular piece of work requires either more or less impact than another in order to properly attain the desired result. For example, when driving nails, it is generally desired to countersink each nail to a uniform depth. However, the resistance encountered by nails being driven into wood is not uniform because of the presence of knots, checks, cracks and the like. For this reason, another object of this invention is the provision of an impact tool having sufficient power to overcome the greatest resistance which will be offered by the work being done, but which contains a means for absorbing the excess impact and cushioning the movement of the moving parts of the tool irrespective of the resistance of the work being done.

In the use of impact tools of conventional design, there has been the danger that the tool will be accidentally actuated at a time when no work is positioned in front of the moving parts thereof. This could result in a nail being inadvertently ejected from the front of the tool at high velocity, which could cause injury to persons in its path. For this reason, it is a further object of this invention to provide a more safe impact tool which can only be used when nail holding parts are forced against some solid object such as the work to be nailed.

A further object of this invention is to provide an impact tool capable of receiving nails, rivets or similar objects through a pneumatic tube and automatically positioning the same for driving.

A further object is the provision of a pneumatic powered impact tool which will emit a single burst of compressed air after every cycle of operation, which burst of compressed air may be transmitted to a feeding device to actuate the same for supplying another nail, rivet or other object which the machine is driving.

Still further objects include the provision of a machine of the above description which is more economical to produce and more simple, practical, safe and reliable in operation than the machines heretofore in use for this purpose.

To these and other ends the invention resides in certain improvements and combinations of parts, all as will be hereinafter more fully described, the novel features being pointed out in the claims at the end of the specification.

A nail driver embodying this invention, herein disclosed by way of illustration, preferably comprises a cylinder mounted on a suitable handle with connection to a source of compressed air and containing a movable piston, a device for holding a nail to be driven, and latch and valve mechanisms for controlling travel of the piston as hereinafter set forth. However, it is to be understood that while this invention is herein described as a nail driver, the scope thereof is not limited to a tool for driving nails, but may, by slight modification, be adapted for performing other functions, such as setting rivets, punching holes, and the like.

Figures 1, 16:
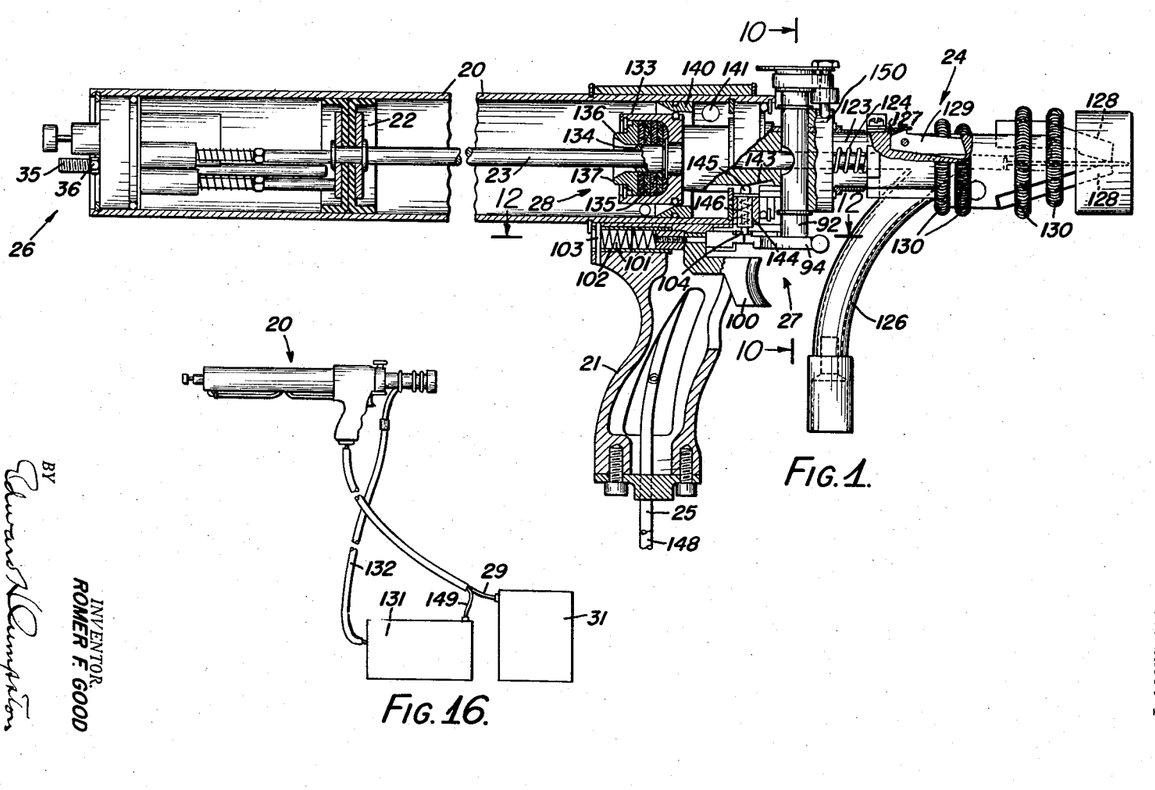
Fig. 1 is a sectional side elevation of a pneumatic impact tool embodying this invention, with the piston in its rearmost position.
Fig. 16 is a schematic view of an impact tool connected to a source of compressed air and a device for pneumatically supplying elements to be impacted.

Referring to the figures, the main body portion of the nail driver comprises a cylinder 20 mounted on a suitable handle 21 as shown in Fig. 1. Cylinder 20 contains a piston 22 which is free to slide in cylinder 20, and which is connected to a forwardly extending piston rod 23. Piston 22 and rod 23 are of relatively light construction, preferably being made of aluminum, magnesium, or other known and suitable light alloys, so that they may have as little inertia as possible. A nail receiving and holding mechanism 24 is located at the front end of cylinder 20 in a position to receive and releasably hold nails in line with piston rod 23 so that the latter may drive the same into the work. A series of valves are mounted in the end closure assembly 26 at the rear end of cylinder 20, with the working parts projecting inwardly in a position to be actuated by piston 22 when the latter moves toward the rear of cylinder 20. A tube 25 (Fig. 4) connects the valves with a flexible tube 29 leading to a suitable source of compressed air 31 (Fig. 16). A latch mechanism 27 (Figs. 1, 2, 3 and 10 to 14, inclusive) is located at the forward end of cylinder 20 adjacent to handle 21 in position to releasably engage the forward end of piston rod 23 for releasing the rod and attached piston 22 to allow the same to move forward to strike the nail held in alignment therewith as described above. A shock absorbing or cushioning device 28 (Figs. 1, 2 and 18) is mounted on the rear end of the nail holding mechanism 24 to stop the forward travel of piston 22 in order to prevent injury to the various working parts of the machine and to absorb the excess energy of the piston should the nail being driven meet less resistance than expected.

Closure assembly 26 which is located in the rear end of the cylinder 20 as described above, is shown in detail in Figs. 5 through 9. Assembly 26 comprises a disk-like closure plate 30 containing ports and carrying cylindrical valve assemblies 32, 33 and 34 and a stop rod 35. Stop rod 35 is threadedly set into plate 30 and locked into position by a nut 36 (Figs. 1 and 5) which permits longitudinal adjustment thereof so that the position at which the rearward travel of piston 22 is stopped may be accurately adjusted.

Figure 5:
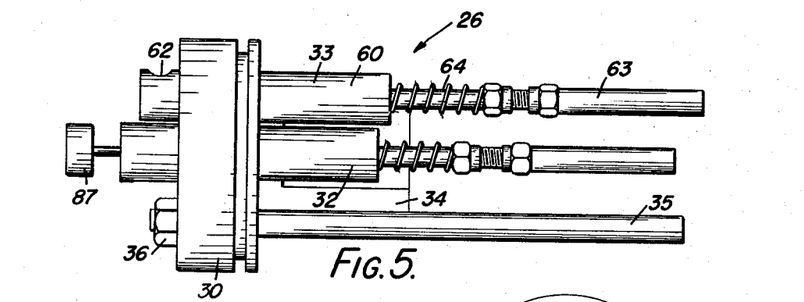
Fig. 5 is an enlarged side elevation of the rear closure and valve assembly removed from the cylinder.
Figures 6, 7:
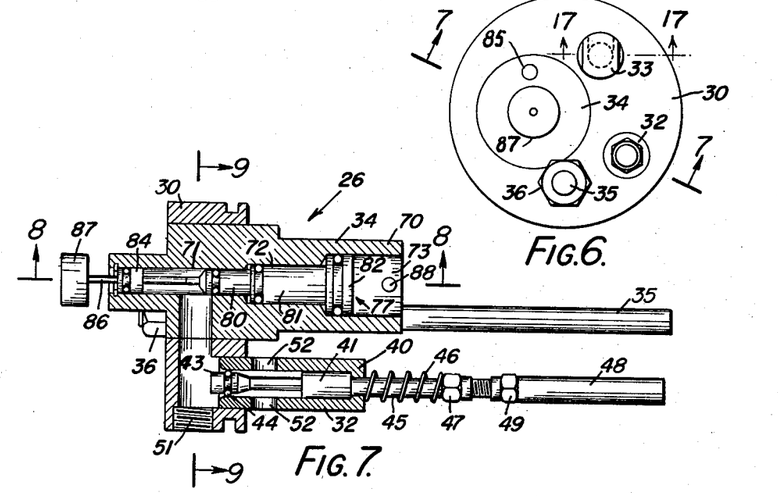
Fig. 6 is a rear elevation of the assembly of Fig. 5.
Fig. 7 is a cross sectional view taken substantially along line 7—7 of Fig. 6.

Intake valve 32 (Fig. 7) comprises a cylinder 40 threadedly engaging plate 30 and containing a slidable plunger 41. Plunger 41 has an extension 43 of reduced diameter, grooved to receive an O-ring 44. An operating rod 45 forming a projection on plunger 41 extends forwardly beyond the cylinder 40 out into the interior of main cylinder 20. This rod is resiliently urged outwardly by a concentric coil spring 46 abutting the end of cylinder 40 and a nut 47 threadedly engaging the outward end of rod 45. A second rod 48 also threadedly engages rod 45 forming an adjustable extension thereof as shown in Figs. 5 and 7. A second nut 49 engages rod 48 providing a lock to hold the same in adjusted position.

Compressed air is fed by tube 25 (Fig. 4) to a port 51 (Fig. 7) in closure plate 30 which communicates with the outer end of cylinder 40. Cylinder 40 is also pierced by a pair of ports 52 communicating with the interior of main cylinder 20. When plunger 41 is in its forwardmost position abutting the forward end of cylinder 40, as shown in Fig. 7, air entering port 51 is prevented by O-ring 44 from entering cylinder 40 as shown in the drawing. However, when operating rod 45 is depressed against the pressure of spring 46, plunger 41 is forced out of the end of cylinder 40 and air entering port 51 is free to pass into cylinder 40 and through ports 52 and into cylinder 20. Thus, when piston 22 is in its normal or rearmost position, as shown in Fig. 1, operating rod 45 is depressed against the pressure of spring 46 and intake valve 32 is held in open position, as described above, opening a passage from the compressed air line 25 to the rear of cylinder 20. Thus, piston 22 is constantly being urged in a forward direction by the compressed air whenever it is in its rearward position, and is only prevented from moving forward under this force by latch mechanism 27, referred to above.

Figures 17, 18, 19:
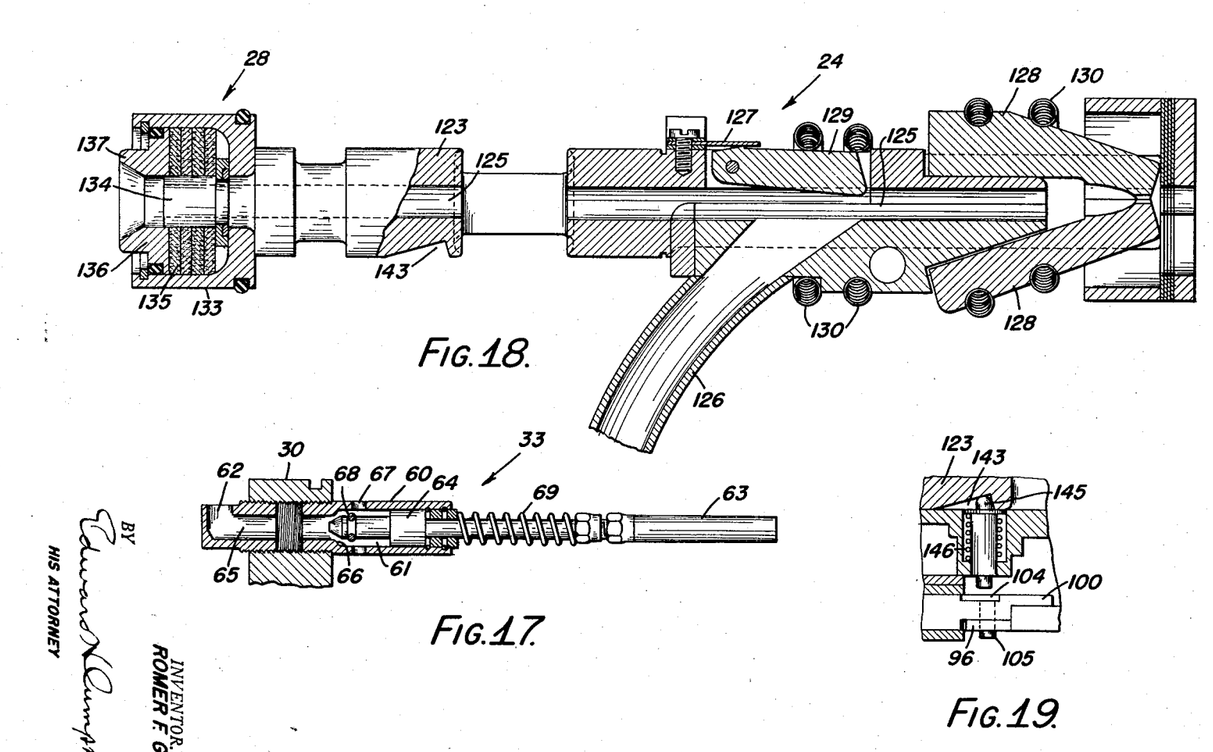
Fig. 17 is a cross sectional view taken substantially along lines 17—17 of Fig. 6.
Fig. 18 is an enlarged side elevational cross sectional view taken substantially along the center line of the nail receiving and aligning assembly removed from the tool.
Fig. 19 is an enlarged fragmentary sectional side elevation of parts shown in Fig. 1 but showing the trigger mechanism in detail.

The exhaust valve mechanism 33, shown in detail in Fig. 17, comprises a cylinder 60 mounted in plate 30 adjacent to and parallel to intake valve 32. Cylinder 60 contains a large cylindrical bore 61 and a smaller cylindrical bore 65. The point of junction of the two cylindrical bores forms a shoulder portion 66. Bore 65 communicates with the atmosphere through a port 62, and bore 61 communicates with the interior of cylinder 20 through a port 67. A plunger 64 is mounted in bore 61, and carries O-ring 68 which is adapted to engage shoulder 66 to seal the passageway between bores 61 and 65. A spring 69 is mounted on plunger 64 for urging it forwardly. Plunger 64 is connected to an operating rod 63 which extends forwardly into cylinder 20 and into the path of piston 22. When piston 22 is in its rearmost position it engages the rod, forcing plunger 64 against shoulder 66, preventing the escape of compressed air from cylinder 20. However, when piston 22 moves forwardly, it disengages rod 63 allowing plunger 64 to move forwardly under the urging of spring 69, to open a passageway from port 67 through bores 61 and 65 to port 62, to vent the pressure in cylinder 20 to the atmosphere. The length of operating rod 63 is adjustable by means of a threaded extension and lock nut as described above in connection with the intake valve 32.

Figure 8:
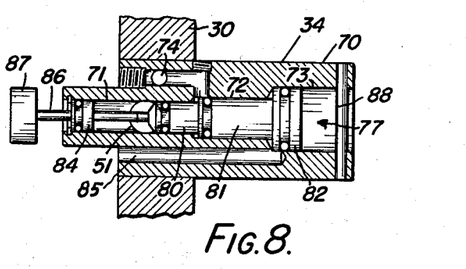
Fig. 8 is a cross sectional view taken substantially along line 8—8 of Fig. 7.
Figure 9:
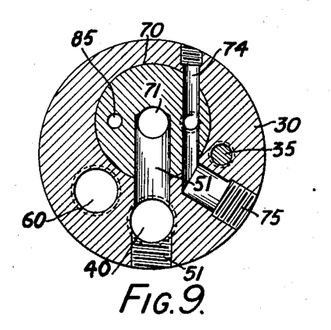
Fig. 9 is a cross sectional view taken substantially along line 9—9 of Fig. 7.

The differential valve 34, best shown in Figs. 7 and 8, also comprises a cylinder 70 mounted in plate 30 with its axis extending parallel to main cylinder 20. Cylinder 70 contains a stepped internal bore comprising three sections of progressively increasing diameter, 71, 72, and 73. The first section 71 communicates with the air supply port 51 as shown in Figs. 7 and 8. The second section 72 communicates with a second port 74 drilled in body 70 which in turn, communicates with a second part 75 in plate 30 (Fig. 9). Port 75 is connected to a forwardly extending tube 76 which projects through an opening 77 (Fig. 4) in the rear portion of cylinder 20 adjacent port 75. The other end of the tube 76 communicates with port 78 adjacent the front of cylinder 20 (Fig. 4), which when the piston assembly 77 (hereafter described) has moved to the right in cylinder 70 (Figs. 7 and 8) and been arrested by a rod 88, allows compressed air to flow into the front part of cylinder 20 to force the piston 22 to the rear of the cylinder. The third and largest section 73 of cylinder 70 communicates with the interior of cylinder 20. A piston assembly 77 (Figs. 7 and 8) comprising three pistons 80, 81 and 82 is slidably mounted in cylinder 70, with the pistons sliding in each of bores 71, 72 and 73, respectively. A second piston 84 is slidably mounted in the outer end of bore 71. Piston 84 carries integral piston rod 86 extending forwardly and rearwardly, and a thumb piece or button 87 mounted on the rearmost extremity of rod 86. The forward end of rod 86 engages the rearwardmost part of piston assembly 77, when the latter is in its rearwardmost position, as shown in Figs. 7 and 8. The rear end of bore 73 is vented to the atmosphere through a port 85.

Figures 2, 4:
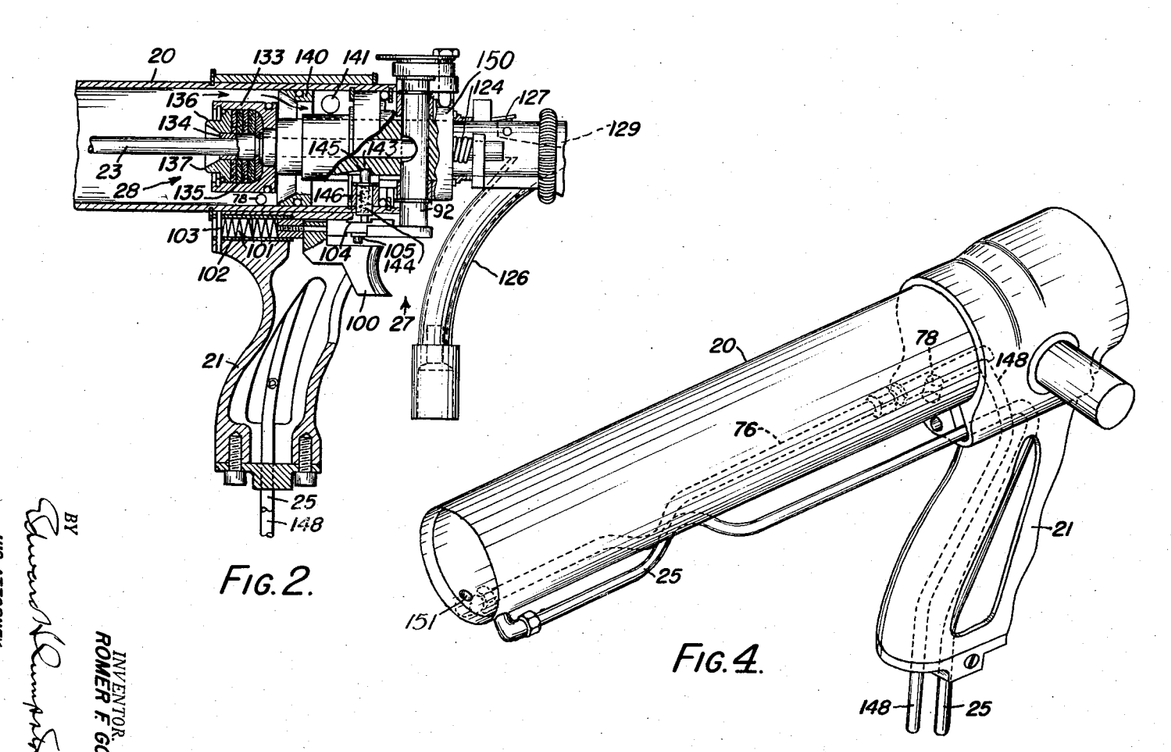
Fig. 2 is a fragmentary elevation similar to the front portion of Fig. 1, showing the working parts in the position assumed prior to driving a nail.
Fig. 4 is a perspective view of the cylinder and handle assembly of the nail driver of Fig. 1 with the working parts removed.

When air under pressure is admitted to main cylinder 20 as described above, this pressure on the face of piston 82 forces the entire assembly 77 rearwardly until piston 82 is stopped by the abutment between bore 73 and adjacent smaller bore 72, in the position illustrated in Figs. 7 and 8. A vent 85 allows any air trapped behind piston 82 to escape to facilitate this movement. It will be noticed in this position that air under pressure from the port 51 communicates with small bore 71, forcing piston 84 to the rear, and tending to force piston assembly 77 forwardly. However, since the area of piston 82 is greater than that of piston 80, the rearward force exerted by the compressed air in cylinder 20 is greater than the forward force exerted by the air on piston 80, so piston assembly 77 remains in its rearward position. However, when the pressure in cylinder 20 is exhausted by exhaust valve 33 on forward movement of piston 22 as described above, the pressure exerted on piston 80 forces piston assembly 77 forwardly into engagement with a stop rod 88. This movement carries piston 80 forwardly, uncovering port 74, thereby opening a passage for compressed air from port 51 through bore 71, into port 74, whence it passes into tube 76 (Fig. 4). Since tube 76 communicates with cylinder 20 in front of piston 22, compressed air flows into this space, forcing piston 22 to the rear, as will hereinafter be described.

Figure 10:
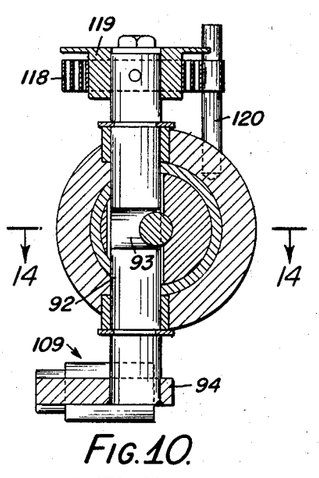
Fig. 10 is an enlarged cross sectional view taken substantially along line 10—10 of Fig. 1, and showing the latch mechanism in detail in its cocked position.
Figure 12:
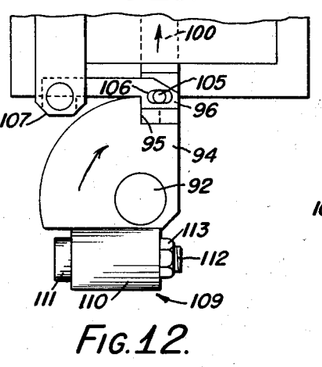
Fig. 12 is a section taken substantially along line 12—12 in Fig. 1, showing the latch mechanism in cocked position.
Figure 13:
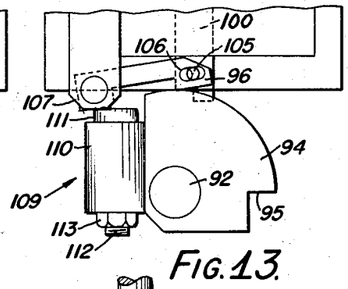
Fig. 13 is a view similar to Fig. 12 showing the latch mechanism after release.
Figure 14:
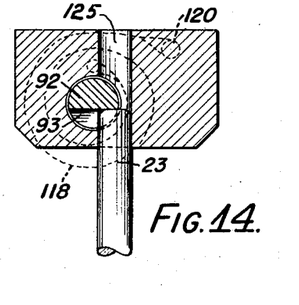
Fig. 14 is a cross sectional view taken substantially along line 14—14 in Fig. 10.
Figure 15:
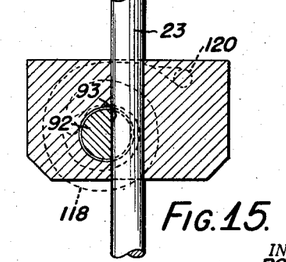
Fig. 15 is a cross sectional view taken substantially along line 15—15 in Fig. 11.

As explained above, when piston 22 is in its rearward position as shown in Fig. 1, intake valve 32 is held in open position thereby admitting compressed air to the rear of cylinder 20 urging piston 22 in a forward direction. A releasable latch mechanism 27 is provided to normally retain the piston in rearward position against the force of the compressed air until it is desired to strike a blow. Latch mechanism 27 comprises a transverse shaft 92 (Figs. 1 and 10–15, inclusive) mounted adjacent the front of cylinder 20 perpendicular to but offset from the longitudinal axis thereof. The forward end of piston rod 23 engages a notch 93 in shaft 92 as shown in Fig. 10. Since shaft 92 is slightly offset from the center of cylinder 20, rod 23 engages the shaft at a point on one side of its axis, as shown in Figs. 10 and 14. This eccentric thrust exerted by rod 23 tends to cause shaft 92 to rotate from its original position, shown in Figs. 10 and 14, through an angle of substantially 90 degrees to the position shown in Figs. 11 and 15, with the sides of notch 93 substantially parallel to the direction of thrust of rod 23. This rotation is prevented, however, by a segment 94 (Figs. 10 and 12) containing a notch 95 rigidly mounted on one end of shaft 92. A sear or latch 96 releasably engages notch 95 on segment 94, thereby preventing the rotation of segment 94 and shaft 92.

Referring to Fig. 1, a trigger 100 is slidably mounted in the top of hand 21 adjacent to the lower wall of cylinder 20. A rearwardly projecting portion of trigger 100 engages a spring 101 set into bore 102 in handle 21 and is confined by a pin 103. Spring 101 urges trigger 100 into its forwardmost position where it remains until moved rearwardly by the index finger of the operator. A forwardly projecting portion of trigger 100 contains a depression or notch 104 the purpose which will be explained below, and a downwardly projecting pin 105 (Figs. 2, 12, 13 and 19). Pin 105 engages a slot 106 in sear 96 which is pivotally mounted on an integral projection 107 forming part of handle 21. As explained above, sear 96 engages notch 95 in a segment 94 which is mounted on the lower end of shaft 92, preventing the rotation of said shaft. When trigger 100 is pulled to the rear against the urging of spring 101 by the operator, pin 105 is moved to the rear in the direction shown by the arrow in Fig. 12, rotating sear 96 about its pivot point in a counterclockwise direction as viewed in the above mentioned figure. This movement disengages sear 96 from notch 95 of segment 94, releasing the restraint on segment 94 and shaft 92 allowing them to rotate (as shown in Figs. 11 and 13) under the urging of piston rod 23 as explained above, thereby releasing the rod and allowing same to move forwardly.

Since piston rod 23 bears on shaft 92 with considerable force, the latter will rotate rapidly when it is released by the sear as explained above. For this reason, it has been found desirable to provide some means for stopping the rotation of shaft 92 and segment 94 when they have rotated the desired 90 degrees. For this purpose a shock absorbing stop device 109 is mounted on one portion of segment 94 as shown in Figs. 1, 12 and 13. Shock absorber 109 comprises a cylinder 110 closed at one end and contains a closely fitting piston 111 projecting from the open end thereof. Cylinder 110 is filled with a resilient shock absorbing material such as, for example, rubber impregnated cork. A threaded extension 112 of the piston extends from the rear face of piston 111 through a hole in the rear wall of cylinder 110, and carries a nut 113 which serves to retain piston 111 in place against the resilient packing in the cylinder. The rotation of segment 94 is stopped when piston 111 strikes projection 107 which forms a part of the handle 21 as explained above. The impact is transmitted by piston 111 to the resilient packing in the cylinder 110, which absorbs the shock and prevents damage to the machine.

Figure 11:
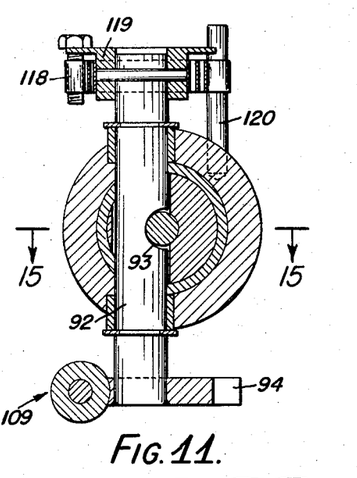
Fig. 11 is a view similar to Fig. 10 showing the latch mechanism after release.

A spring 118 (Figs. 10, 11, 14 and 15) is mounted on a collar 119 which is pinned to the upper end of transverse shaft 92 as shown in Figs. 10 and 11. The other end of spring 118 is fixed to the upper part of cylinder 20 by a pin 120. Spring 118 is so mounted that it tends to oppose the rotation of transverse shaft 92 during the release of the piston as described above, but does not have power enough to substantially interfere with this motion. However, when piston 22 and rod 23 have been moved rearwardly to disengage transverse shaft 92 in a manner that will be hereinafter described, spring 118 returns shaft 92 to its original position, allowing sear 96 to again fall into and engage notch 95 in segment 94. This locks shaft 92 into position, to hold the piston and its rod in rearward position, as described above, in preparation for another blow.

Figure 3:
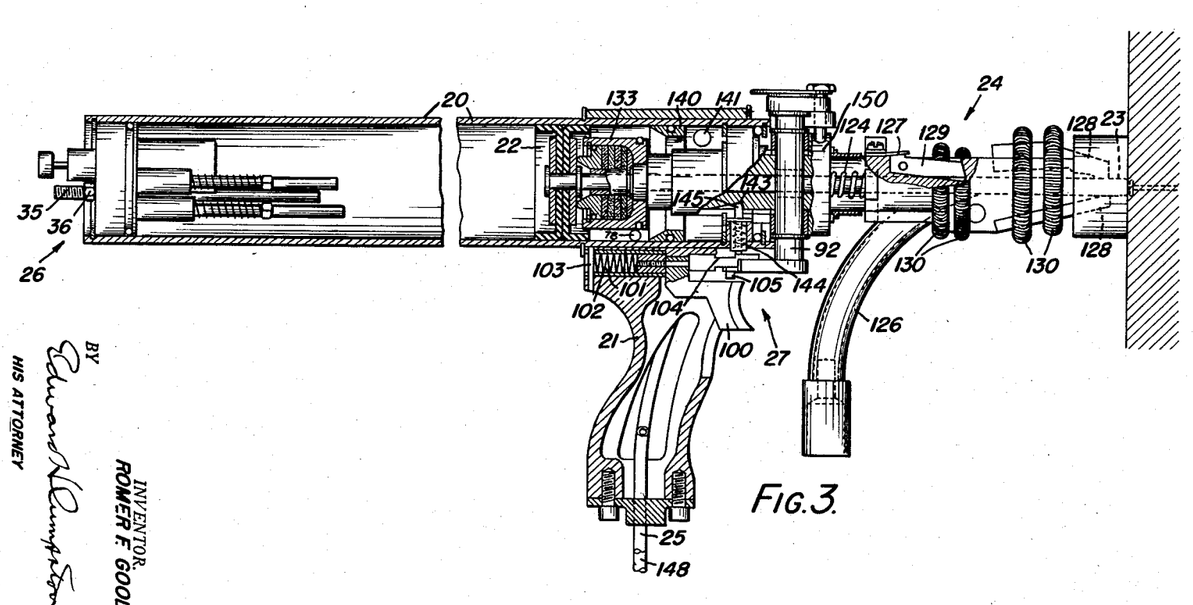
Fig. 3 is a view similar to that of Fig. 1 showing the piston in its forward most position immediately after having driven a nail.

Nail receiving and aligning assembly 24 comprises a cylindrical body portion 123 which is slidably mounted in a central bore in a closure plate 150 fixed in the forepart of cylinder 20 as shown in Figs. 1, 2 and 3, and is resiliently held in its forwardmost position by a spring 124 bearing at one end against assembly 24 and at the other against cylinder closure plate 150. Body 123 (Fig. 18) is centrally drilled to form an axial bore 125, extending the entire length thereof, and is provided with longitudinal slots communicating therewith. A tube 126, having a part on the end thereof fitting into one of these slots, is attached to and resiliently held in the lower side of body portion 123 by two of a series of coil springs 130. The bore of tube 126 is gradually curved and fairs into bore 125 to provide a continuous, smooth, and gradually curving path into bore 125. A plurality of jaws 128 are set in the slots communicating with bore 125 adjacent the forward end of body portion 123. Jaws 128 are held in their inwardmost position by springs 130, so that they tend to grip and frictionally hold nails thrust therebetween, as shown in Fig. 1. A small inwardly extending latch 129 is pivotally mounted in one of the above mentioned slots in body portion 123 with its forward end extending into bore 125 and its rearward end projecting slightly. A small leaf spring 127, mounted on the top of body portion 123, engages the outwardly projecting portion of latch 129, resiliently forcing the forward end thereof inwardly into bore 125. When a nail is positioned between jaws 128 as described above, the forward end of latch 129, resiliently forced inwardly by spring 127, as described above, constitutes a stop which will prevent any rearward movement of the nail which might occur, for example, when the machine is held in vertical position for driving nails into a ceiling. The forward end of latch 129 is thrust out of the way against the urging of spring 127 by the forward end of rod 23 when the nail is driven. In operation, nails are supplied pneumatically, one at a time, from a central reservoir 131 (which forms no part of this invention) through a flexible tube 132 into tube 126 whence they are guided into bore 125 where they are grasped and releasably held by inwardly extending jaws 128. During the forward motion of the piston, the end of piston rod 23 moves forwardly in bore 125, striking the head of the nail releasably held in position by jaws 128, and driving it through the end of bore 125 and into the work, as shown in Fig. 3.

The rear end of body portion 123 carries shock absorbing assembly 28 comprising a hollow cylinder 133 with a concentric tube 134 which constitutes a rearward extension of bore 125 as shown in Figs. 1, 2, 3 and 18. The interior of cylinder 133 is filled with a resilient material such, for example, as a stack of rubber impregnated cork rings 135 as shown in Figs. 1 and 18. A washer 136 rests against resilient rings 135 and has a rearwardly extending lip portion 137 adapted to engage piston 22 at the end of its forward motion and transfer the impact thereof to the resilient packing which absorbs the same, dissipating the shock and excess energy harmlessly. Washer 136 is preferably made of aluminum, magnesium, or other known and suitable light alloys, so that it may have as little inertia as possible.

The forward end of cylinder 133 is machined to closely fit the mating portion of a ring 140 rigidly affixed to cylinder 20. Suitable packing means are provided so that cylinder 133 and ring 140 are adapted to engage each other in air tight relation when the nail receiving and aligning assembly is in its forwardmost position, as shown in Fig. 1. When in this relation, air imprisoned in cylinder 20 ahead of piston 22 has no means of escaping. However, when the impact tool is forced against the object to be nailed, as described above, the cylinder 20 is forced forwardly relative to nail receiving and aligning assembly 24, against the urging of spring 124. This causes ring 140 to move forwardly relative to cylinder 133, as shown in Fig. 2, thereby opening an annular passageway between the cylinder and the ring for the air trapped ahead of piston 22, so that this air may escape to the atmosphere through a port 141, as shown by the arrows in the above mentioned figure. Thus, the air trapped ahead of piston 22 is rapidly exhausted and does not provide any substantial resistance to the rapid forward movement of piston 22.

A notch 143 is formed in the lower portion of body 123 as shown in Figs. 1, 2, 3, 18 and 19. A small cylinder 144 (Figs. 2 and 19) is mounted in vertical position above trigger 100 and under body portion 123. Cylinder 144 contains a plunger 145 which extends from both ends thereof, and which is resiliently forced upward by a coil spring 146. Plunger 145 bears against the lower portion of body portion 123 and is thereby held in its lowermost position against the urging of spring 146. While plunger 145 is held in its lowermost position as described above, it engages notch 104 in trigger 100, and thereby prevents the trigger from being moved rearwardly. However, when body portion 123 is moved rearwardly, notch 143 moves into line with plunger 145 and the latter is free to move upwardly under the urging of spring 146 into the notch as is illustrated in Fig. 19. This upward movement of plunger 145 removes the same from notch 104 in trigger 100 and frees the latter for rearward movement. Thus, it can be seen that the trigger may be operated to release the piston only when nail receiving means 24 is in its rearwardmost position, bringing notch 143 into alignment with plunger 145 as described above. Thus, the trigger mechanism can be actuated to release the piston only when the nail driver has been pressed against an object to be nailed with sufficient force to cause the nail receiving and aligning mechanism to be moved to its rearwardmost position against the urging of spring 124, and it is impossible to discharge a nail accidentally when the nail driver is removed from the work. Thus, there is no danger of ejecting a nail accidentally in a manner that might injure persons in the vicinity.

After piston 22 has travelled to its forwardmost position and has driven a nail, the rear end of cylinder 20 is vented to the atmosphere by exhaust valve 33 as described above. At the same time, differential valve 34 has shifted position and has opened a passage from the compressed air supply port 51 to tube 76 (Fig. 4) which communicates with port 78 which communicates with cylinder 20 behind ring 140. Compressed air thus flows into cylinder 20 in front of piston 22. However, as long as body portion 123 is still in its rearward position, there is an open passage through the annular space between ring 140 and cylinder 133 to exhaust port 141, and thus air entering port 78 is free to escape through this exhaust port. However, when the gun is removed from the work by the operator, spring 124 forces nail receiving assembly 24 forward to its original position as shown in Fig. 1, and the base of cylinder 133 comes into air tight engagement with ring 140 thereby sealing the passage from the front of cylinder 20 to exhaust port 141. When this occurs, the compressed air entering port 78 no longer has any means for escape, and thus piston 22 is forced rearwardly until its motion is stopped by rod 35 in the rear of the cylinder as shown in Fig. 1. The piston is now in its original position at the rear of the cylinder, as shown in Fig. 1, and is ready for another cycle of operation.

When the path of escape for the compressed air entering cylinder 20 through port 78 is closed as described above, and piston 22 is forced to the rear, the pressure that is built up in tube 76 forces a flow of air through a branch tube 148 (Fig. 4) which leads down through the handle 21. Tube 148 is connected by means of a flexible tube 149 to nail supplying device 131, which is adapted to be actuated by this impulse of compressed air to supply a fresh nail through tubes 132 and 126 to bore 125 as described above. Any suitable and known nail supplying device may be used for this purpose, and the particular device used for this purpose forms no part of this invention.

In operation, the cycle of movements may be most logically described by assuming the piston be latched in its rearmost position and a nail to be retained in driving position between the jaws of the nail aligning assembly as shown in Fig. 1. In this position the exhaust valve 33 (Fig. 17) is held closed and intake valve 32 (Fig. 7) is held in open position thereby holding a passage open for compressed air from tube 25 to cylinder 20 in the rear of piston 22. The space behind piston 22 is therefore under the full pressure of the compressed air from the source connected to tube 25. This pressure holds differential valve 34 in closed position (Figs. 7 and 8), which prevents compressed air from flowing to the forward part of cylinder 20 through tube 76 and at the same time, urges piston 22 forwardly against the latching mechanism 27. In order to drive a nail, the operator grasps handle 21 and forces the gun against the work, thereby forcing nail receiving assembly 24 and its associated parts to the rear against the tension of spring 124, as described above. This movement has two effects: (1) plunger 145 moves upwardly into notch 143 under the urging of spring 146, thereby unlocking the trigger mechanism (Figs. 2 and 19), and (2) cylinder 133 moves rearwardly out of engagement with ring 140, opening an escape route for the air trapped in cylinder 20 ahead of piston 22 so that it is free to escape through port 141 (Fig. 2) when the piston moves forwardly. When the operator pulls the trigger, shaft 92 is released, and rotates under the urging of piston rod 23, releasing the piston and rod which move rapidly forwardly under the urging of the fully compressed air in the rear portion of cylinder 20.

As soon as piston 22 is released, the rearward pressure of the compressed air on closure plate 30 is no longer balanced by the forward pressure on the piston, so that a net rearward force is exerted on the body of the tool. This rearward force tends to move the tool rearwardly and away from the work against the force exerted by the operator on handle 21. The acceleration to the rear depends directly on the magnitude of this force and inversely on the weight of the moving parts. In like manner, the forward acceleration of the piston and the piston rod depends directly on this force and inversely on the weight of these parts according to well known laws of physics. Thus, the ratio of the rearward acceleration of the tool, as a whole, to the forward acceleration of the piston and piston rod depends on the inverse ratio of the weight of these respective parts.

For this reason, it is advantageous to have the piston as light as possible in order that this ratio be kept as small as possible. In practice it has been found that, by the use of aluminum and magnesium alloys the weight of the piston and rod can be reduced to approximately 4 ounces, and still have the requisite strength and durability to deliver powerful impact. The embodiment of the tool described herein weighs about 8 pounds, and thus the ratio of the weight of the piston is about 1 to 32. However, it has been found in practice that the recoil does not become excessive until this ratio approaches 1 to 16. On the other hand, since it is desirable that tools of this sort be readily portable, it is undesirable to increase the weight of the tool greatly beyond the 8 pound limit mentioned above, so that the practical lower level of the above weight ratio is 1 to 50.

Although the recoil forces are kept to a minimum because of the weight ratio of the piston to the tool as explained above, there is always a residual amount of recoil that cannot be completely eliminated. However, not even this slight amount of movement is transferred to nail receiving assembly 24 and its associated parts, as the latter are forced forwardly and held in contact with the work by the tension of spring 124 which has been compressed, as described above. Thus, even though cylinder 20 recoils rearwardly, this motion will not move the nail holding jaws 128 rearwardly out of contact with the work, since any retraction of the cylinder assembly still maintains the jaws in contact with the work due to the forward force exerted by the spring 124, which is under compression, and thus retains the jaws in contact with the work and thus an accurate and well placed blow is assured. Further, since nail receiving assembly 24 is always held in contact with the work by spring 124, shock absorbing mechanism 28 is held a constant distance from the work thereby. Thus, piston 22 and rod 23 are always stopped in the same position relative to the work, and thus every nail is driven into the work to a uniform depth, regardless of other variables.

The front end of rod 23 moves forward in bore 125 of the nail aligning assembly 24 and strikes the head of the nail held therein, driving the same into the work, as shown in Fig. 3. As explained above, the piston is stopped at a predetermined position by striking shock absorbing mechanism 28 which prevents piston rod 23 from driving the nail into the work further than is desired.

As piston 22 moves forwardly as described above, it moves out of engagement with rods 48 and 63, allowing the latter to move forwardly under the urging of springs 46 and 64, respectively. This causes intake valve 32 to close, cutting off a further supply of compressed air to cylinder 20, and at the same time, allows exhaust valve 33 to open, allowing the compressed air in the rear portion of cylinder 20 to escape to the atmosphere. It will be noted that this valve action is free to begin as soon as the piston disengages rods 48 and 63 as described above. However, due to the light weight of piston 22 and rod 23, the latter moves very rapidly under the urging of the compressed air, and completes their stroke before valves 32 and 33 can act under the urging of the springs as described.

When the pressure in the rear portion of cylinder 20 has dropped to substantially atmospheric pressure, the differential valve moves to its forward position, to the right from its position shown in Figs. 7 and 8, and opens a passage for the compressed air to pass from port 51, bore 71, through port 74 and tube 76 into port 78 (Fig. 4) in cylinder 20, in front of piston 22. This air is free to pass through the annular space between cylinder 133 and ring 140 and out through port 141 to the atmosphere. However when the operator removes the gun from the work into which the nail has been driven as described above, spring 124 maintains nail aligning mechanism 24 in contact with the work while cylinder 20 is moved rearwardly until the rear portion of cylinder 133 engages ring 140, thereby sealing the annular opening therebetween, and closing the escape route for the compressed air entering the cylinder at port 78. The air then forces piston 22 rearwardly until it is brought to a stop by stop rod 35. In this postion, piston rod 23 has moved to the rear a sufficient distance to disengage shaft 92. When this occurs, the shaft is rotated back to its original position by the tension on spring 118, and the latch mechanism relocks itself in preparation for another cycle. Branch 148 of tube 76 (Fig. 4) diverts a portion of the compressed air described above to the nail feeding device which is adapted to be actuated thereby to send a nail under pneumatic pressure down tube 126 and into the nail receiving mechanism 24 where it is gripped by jaws 128 and held in a position for driving, as described above. In the meantime, piston 22 has engaged rods 63 and 48 during the last portion of its rearward motion, thereby opening intake valve 32 and simultaneously closing exhaust valve 33. This action opens a passage for the compressed air to flow into the rear of cylinder 20 behind piston 22, building up pressure therein in preparation for another cycle of operation. When this pressure reaches its sufficient magnitude, differential valve 34 is forced to its rearwardmost position thereby, closing the passage for the compressed air to the front of the cylinder. The nail driver is now in its initial position and ready to drive another nail and to repeat the cycle described above.

In its initial position, when the nail driver is first placed into use, or if the nail feeding means has failed to provide a nail, the operator may wish to actuate the nail feeder without releasing the piston. He may do this by sending a compressed air signal to the nail feeding device through tube 148 by depressing the button 87 on differential valve 34, forcing piston assembly 77 (Figs. 7 and 8) forwardly against the pressure in the rear of cylinder 20. This opens a passage for compressed air through port 74 into tube 76 and into tube 148 to actuate the nail feeding mechanism. Upon release of button 87 the pressure in the rear portion of cylinder 20 behind the piston returns differential valve 34 to its initial position. Thus, the operator can cause a signal to be sent to the nail feeding mechanism at any time without releasing the piston when no nail is in place in the nail holding device.

It is apparent from the above description that the invention provides a single-stroke driver having a practical and durable type of construction operating in a rapid, efficient and convenient manner with minimum risk of injury to the operator.

While the impact tool herein disclosed has been described in terms of a nail driver, this invention is not restricted thereto. This invention may also be used for other purposes such as setting rivets, and the like, and the term "elements to be impacted" is intended to include any object, such as nails or rivets, which is adapted for application by means of impact.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A pneumatic impact tool comprising a cylinder having a front and a rear end, a piston movable therein, releasable latch means normally holding said piston in a position adjacent to but spaced from the rear end of said cylinder, a source of air under pressure connected with said cylinder, valve means for introducing said air to the rear end of said cylinder behind said piston, means actuated by said piston when in rearmost position for opening said valve means, and means for releasing said latch means to allow said piston to move forwardly under the urging of said compressed air.

2. A pneumatic impact tool comprising a cylinder having a front end and a rear end, a piston movable in said cylinder, a source of air under pressure connected with said cylinder, valve means for controlling the flow of compressed air into and out of said cylinder with operative parts of said valve means extending inwardly into the path of said piston and adapted to be actuated thereby, latch means for retaining said piston in a position adjacent the rear end of said cylinder and means for releasing said latch means to allow said piston to move forwardly.

3. A pneumatic impact tool comprising a cylinder having a front end and a rear end, a piston movable in said cylinder and provided with impact means, a source of air under pressure connected with said cylinder, valve means for controlling the flow of compressed air into and out of said cylinder with operative parts of said valve means extending inwardly into the path of said piston and adapted to be actuated thereby, latch means for retaining said piston in a position adjacent the rear end of said cylinder, means for releasing said latch means to allow said piston to move forwardly, and pressure responsive valve means to supply compressed air to said cylinder in front of said piston to return the same to the rearward position.

4. A pneumatic impact tool comprising a cylinder having a front end and a rear end, a piston movable in said cylinder and provided with impact means, a source of air under pressure connected with said cylinder, valve means for controlling the flow of compressed air into and out of said cylinder with operative parts of said valve means extending inwardly into the path of said piston and adapted to be actuated thereby, latch means for retaining said piston in a position adjacent the rear end of said cylinder, means for releasing said latch means to allow said piston to move forwardly and resilient cushion means adapted to limit the forward movement of said piston and to absorb the excess energy thereof.

5. A pneumatic impact tool comprising a cylinder having a front end and a rear end, a piston movable in said cylinder and provided with impact means, a source of air under pressure connected with said cylinder, intake and exhaust valve means for controlling the flow of air into and out of said cylinder, respectively, said valve means having operative parts extending inwardly into the path of said piston and adapted to be actuated thereby, latch means for retaining said piston in a position adjacent to the rear of said cylinder in engagement with said operative parts to hold said intake valve in open position and said exhaust valve in closed position and means for releasing said latch means to allow said piston to move forward and disengage said operative parts.

6. A pneumatic impact tool comprising a cylinder having a front end and a rear end, a piston provided with impact means movable in said cylinder, means for connecting said cylinder with a source of compressed air, resiliently biased intake and exhaust valve means for controlling the flow of said air into and out of the rear end of said cylinder, said valve means having operative parts extending inwardly into the path of said piston for actuation thereby, latch means for retaining said piston in a position adjacent to the rear end of said cylinder in engagement with said operative parts, means for releasing said latch means, and pressure actuated valve means for controlling a flow of air to the front end of said cylinder.

7. A pneumatic impact tool comprising a cylinder having a front end and a rear end, means for connecting said cylinder with a source of air under pressure, valve means for admitting air to and exhausting air from said cylinder, a piston movable in said cylinder and having a forwardly projecting impact portion, a part extending transversely of said cylinder and mounted for rocking movement with an abutment extending into the path of said projecting portion in one position of said part, said projecting portion engaging said abutment, latch means for preventing the rocking of said transverse part under the urging of said projecting portion, and trigger means for releasing said latch to allow said transverse part to move said abutment out of the path of said projecting portion to allow the same to move forwardly.

8. A pneumatic impact tool comprising a cylinder, a piston movable in said cylinder, piston rod means extending substantially along the axis of said cylinder, latch mechanism engaging said rod means when said piston and rod means are in their rearmost position, means for releasing said latch mechanism, means for supplying compressed air to said cylinder in rear of said piston while said piston is held by said latch mechanism against forward movement to accumulate the pressure of said air, shock absorbing means to limit the forward movement of said piston and rod means to absorb the excess energy thereof, and means movable relative to said cylinder by engagement with the work and provided with valve means for venting said cylinder forwardly of said piston.

9. A pneumatic impact tool comprising a cylinder, a piston movable in said cylinder, piston rod means extending substantially along the axis of said cylinder, latch mechanism engaging said rod means when said piston and rod means are in their rearmost position, means for releasing said latch mechanism, means for supplying compressed air to said cylinder in rear of said piston while said piston is held by said latch mechanism against forward movement to accumulate the pressure of said air, and means movable relative to said cylinder by engagement with the work and provided with shock absorbing means to limit the forward movement of said piston and rod means and to absorb the excess energy thereof.

10. A pneumatic impact tool comprising a cylinder, a piston movable in said cylinder, piston rod means extending substantially along the axis of said cylinder, latch mechanism engaging said rod means when said piston and rod means are in their rearmost position, means for releasing said latch mechanism, means for supplying compressed air to said cylinder in rear of said piston while said piston is held by said latch mechanism against forward movement to accumulate the pressure of said air, means movable relative to said cylinder by engagement with the work and provided with shock absorbing means to limit the forward movement of said piston and rod means to absorb the excess energy thereof, and valve means actuated by said work engaging means for venting said cylinder forwardly of said piston.

11. A pneumatic impact tool comprising a cylinder, a piston movable in said cylinder, piston rod means extending substantially along the axis of said cylinder, latch mechanism engaging said rod means when said piston and rod means are in their rearmost position, means for releasing said latch mechanism, means for supplying compressed air to said cylinder in rear of said piston while said piston is held by said latch mechanism against forward movement to accumulate the pressure of said air, means movable relative to said cylinder by engagement with the work and provided with means for disabling said latch releasing mechanism, and valve means actuated by said work engaging means for venting said cylinder forwardly of said piston.

12. A pneumatic impact tool comprising a cylinder, a piston movable in said cylinder, piston rod means extending substantially along the axis of said cylinder, latch mechanism engaging said rod means when said piston and rod means are in their rearmost position, means for releasing said latch mechanism, means for supplying compressed air to said cylinder in rear of said piston while said piston is held by said latch mechanism against forward movement to accumulate the pressure of said air, means movable relative to said cylinder by engagement with the work and provided with shock absorbing means to limit the forward movement of said piston and rod means to absorb the excess energy thereof, and means actuated by said work engaging means for disabling said latch releasing mechanism.

13. A pneumatic impact tool comprising a cylinder, a piston movable in said cylinder, piston rod means extending substantially along the axis of said cylinder, latch mechanism engaging said rod means when said piston and rod means are in their rearmost position, means for releasing said latch mechanism, means for supplying compressed air to said cylinder in rear of said piston while said piston is held by said latch mechanism against forward movement to accumulate the pressure of said air, means movable relative to said cylinder by engagement with the work and provided with shock absorbing means to limit the forward movement of said piston and rod means and absorb the excess energy thereof, valve means actuated by said work engaging means for venting said cylinder forwardly of said piston, and means actuated by said work engaging means for disabling said latch releasing mechannsm.

14. A pneumatic, single-action impact tool comprising a cylinder, a piston movable in said cylinder, piston rod means extending through said cylinder, latch mechanism engaging said rod means when said piston and rod means are in rearmost position in said cylinder, means for releasing said latch mechanism, means for supplying compressed air to said cylinder in rear of said piston while said piston is held by said latch mechanism to accumulate the pressure of said air, and means movable relative to said cylinder by engagement with said work and provided with means for disabling said latch releasing mechanism while disengaged from the work.

15. A portable, pneumatic, single-action impact tool comprising a cylinder, piston means movable in said cylinder and provided with impact means, means for connecting said cylinder on opposite sides of said piston means with a source of air under pressure, valve means for controlling the flow of air into and out of said cylinder and provided with means for actuation by said piston means in the retracted position thereof, releasable latch means for holding said piston means in said retracted position to accumulate said air pressure thereon, the weight of said piston and impact means comprising between $1/16$ and $1/60$ of the weight of said tool, and means movable relatively to said cylinder by engagement with the work for positioning said tool thereon.

16. A portable, pneumatic, single-action impact tool comprising a cylinder, piston means movable in said cylinder and provided with impact means, means for connecting said cylinder on opposite sides of said piston means with a source of air under pressure, valve means for controlling the flow of air into and out of said cylinder, releasable latch means for holding said piston means in retracted position to accumulate said air pressure thereon, the weight of said piston and impact means comprising between $1/16$ and $1/60$ of the weight of said tool, and means movable relatively to said cylinder by engagement with the work for positioning said tool relative thereto, and shock absorbing means on said positioning means for limiting the travel of said piston and impact means relative to the work and absorbing the energy thereof.

17. A portable, pneumatic, single-action impact tool comprising a cylinder, a piston means movable in said cylinder and provided with impact means, means for connecting said cylinder on opposite sides of said piston means with a source of air under pressure, valve means for controlling the flow of air into and out of said cylinder and provided with means for actuation by the movement of said piston means in the retracted position thereof, releasable latch means for holding said piston means in said retracted position to accumulate said air pressure thereon, the weight of said piston and impact means comprising between $1/16$ and $1/60$ of the weight of said tool, means movable relatively to said cylinder by engagement with the work for positioning said tool thereon, and shock absorbing means on said work engaging means for limiting the movement of said piston and impact means and absorbing the energy thereof.

18. A pneumatic impact tool comprising a cylinder, piston means in said cylinder having an impact means, means for connecting said cylinder on opposite sides of said piston means with a source of air under pressure, valve means for controlling said connecting means and the movement of said piston, a part mounted to swing into the path of said impact means to hold the same in retracted position for accumulating the pressure of air on said piston means, latch means for holding said part in position to obstruct the movement of said impact means, trigger means for releasing said latch means, and shock absorbing stop means for cushioning the movement of said part by said impact means.

19. A pnenmatic impact tool comprising a cylinder, piston means in said cylinder provided with impact means, means for connecting said cylinder on opposite sides of said piston means with a source of air under pressure, valve means for controlling said connecting means, a shaft mounted for swinging movement and having a part arranged to swing into and out of position to obstruct movement of said impact means, means for swinging said shaft to position for obstructing said impact means, latch means for holding said shaft in said obstructing position against actuation by said impact means, trigger means for releasing said latch means, and shock absorbing stop means for cushioning the swinging movement of said shaft under actuation by said impact means.

References Cited in the file of this patent

UNITED STATES PATENTS

| 562,518 | Ferguson | June 23, 1896 |
| 1,014,639 | Colwell | Jan. 16, 1912 |
| 1,102,271 | Hunter | July 7, 1914 |
| 1,703,458 | Ruff | Feb. 26, 1929 |
| 2,187,692 | Oeckl | Jan. 16, 1940 |
| 2,257,267 | Lundgren | Sept. 30, 1941 |
| 2,498,503 | Papalia | Feb. 21, 1950 |
| 2,535,588 | Mead | Dec. 26, 1950 |
| 2,543,942 | Shaff | Mar. 6, 1951 |
| 2,671,214 | Juilfs | Mar. 9, 1954 |
| 2,732,554 | Knott | Jan. 31, 1956 |